(12) United States Patent
Hosoe

(10) Patent No.: US 7,868,684 B2
(45) Date of Patent: Jan. 11, 2011

(54) SEMICONDUCTOR DEVICE WHOSE INTERNAL POWER SUPPLY VOLTAGE IS GENERATED BY VOLTAGE STEP-UP CIRCUIT

(75) Inventor: Yuki Hosoe, Tokyo (JP)

(73) Assignee: Elpida Memory, Inc., Tokyo (JP)

( * ) Notice: Subject to any disclaimer, the term of this patent is extended or adjusted under 35 U.S.C. 154(b) by 11 days.

(21) Appl. No.: 12/379,358

(22) Filed: Feb. 19, 2009

(65) Prior Publication Data

US 2009/0219082 A1 Sep. 3, 2009

(30) Foreign Application Priority Data

Feb. 29, 2008 (JP) ............... 2008-050172

(51) Int. Cl.
*G05F 1/10* (2006.01)
*G05F 3/02* (2006.01)
(52) U.S. Cl. ..................................... 327/536
(58) Field of Classification Search ............... 327/536; 363/59–60
See application file for complete search history.

(56) References Cited

U.S. PATENT DOCUMENTS

| 6,229,385 | B1 * | 5/2001 | Bell et al. ................... 327/565 |
| 6,563,235 | B1 * | 5/2003 | McIntyre et al. ............ 307/109 |
| 6,653,889 | B2 | 11/2003 | Jang et al. |
| 2003/0011420 | A1 * | 1/2003 | Kawai et al. ................. 327/536 |
| 2003/0020534 | A1 | 1/2003 | Jang et al. |

FOREIGN PATENT DOCUMENTS

JP 2003-151279 5/2003

* cited by examiner

*Primary Examiner*—Quan Tra
(74) *Attorney, Agent, or Firm*—McGinn IP Law Group, PLLC

(57) ABSTRACT

A semiconductor device includes a voltage step-up circuit and a control circuit. The voltage step-up circuit includes at least a first capacitor and a second capacitor which generate an internal power supply voltage. The control circuit controls the voltage step-up circuit. The control circuit connects the first and second capacitors in series to perform a first voltage step-up operation and connects the first and second capacitors in parallel to perform a second voltage step-up operation. The voltage step-up circuit generates a first stepped-up voltage in the first voltage step-up operation and generates a second stepped-up voltage in the second voltage step-up operation. The circuit area of the voltage step-up circuit with a plurality of stepped-up levels is reduced.

16 Claims, 5 Drawing Sheets

SEMICONDUCTOR DEVICE WHOSE INTERNAL POWER SUPPLY VOLTAGE IS GENERATED BY VOLTAGE STEP-UP CIRCUIT

REFERENCE TO RELATED APPLICATION

This application is based upon and claims the benefit of the priority of Japanese patent application No. 2008-050172, filed on Feb. 29, 2008, the disclosure of which is incorporated herein in its entirety by reference thereto.

BACKGROUND OF THE INVENTION

1. Field of the Invention

The present invention relates to a semiconductor device whose internal power supply voltage is generated by a voltage step-up circuit, and more specifically to a semiconductor device whose internal power supply voltage is generated by a voltage step-up circuit with a plurality of stepped-up levels.

2. Description of Related Art

When an external power supply voltage VDD is lowered, an internal power supply voltage VPP is stepped-up by a three-times voltage step-up circuit. A technology is known that application of an internal power supply voltage VPEQ, which is lower than the internal power supply voltage VPP, to part of a circuit that is supplied with the internal power supply voltage VPP reduces the power consumption. Here the internal power supply voltages VPP and VPEQ are higher than the external power supply voltage VDD; and the internal power supply voltage VPEQ is lower than the internal power supply voltage VPP.

FIG. 4 is a block diagram showing a structure of a conventional three-times voltage step-up circuit (VPP voltage step-up circuit) 120. With reference to FIG. 4, the VDD supply circuit 111 supplies a voltage VDD to a node B while a node A is at a low level. The VDD supply circuit 111 steps up a potential of the node B by separating the node B from the VDD supply circuit 111 before the node A becomes a high level. A VSS supply circuit 112 supplies a voltage VSS while the node B is supplied with the voltage VDD. The VSS supply circuit 112 separates a node C from the VSS supply circuit 112 at the same time when the node B is separated from the VDD supply circuit 111. The VPP latch circuit 113 supplies the voltage VDD to a node D while the node C is supplied with the voltage VSS. A VPP latch circuit 113 separates the node D from the VDD supply circuit 111 at the same time when the node C is separated from the VSS supply circuit 112, so that the VPP latch circuit 113 supplies an electric potential of node D, which is stepped up by connecting the node C with the node B, to a terminal VPP.

FIG. 5 is a block diagram showing a structure of a conventional two-times voltage step-up circuit (VPEQ voltage step-up circuit) 110. The VPEQ latch circuit 114 in FIG. 5 supplies a voltage VDD to a node B while the node A is at a low level. A VPEQ latch circuit 114 separates the node B from the VDD supply circuit 111 before the node A becomes a high level, so that the VPEQ latch circuit 114 supplies a stepped up potential of the node B to a terminal VPEQ. A two-times voltage step-up circuit is employed as the VPEQ voltage step-up circuit 110. The VPEQ latch circuit 114 transfers a potential of the node B stepped up by a pump capacitor (capacitor) between the node A and the node B to the terminal VPEQ when the node B is kept higher than or equal to VDD by the VPEQ latch circuit 114 and the node A oscillates with an amplitude VDD. These operation timings are controlled by the pulse signal B and the pulse signal D.

The VPP voltage step-up circuit 120 comprises a VDD supply circuit 111 and a VSS supply circuit 122. The VDD supply circuit 111 keeps the node B at a potential higher than or equal to VDD. The VSS supply circuit 112 draws down the electric potential of the node C to VSS. The VPP latch circuit 113 draws down the level of the node D, stepped up by the two-stage pump capacitors (capacitors) between the node A and the node B and between the node C and the node D, to VPP when the node A oscillates with the amplitude VDD. These operation timings are controlled by pulse signals A to C and E. Here, the pulse signals are adjusted to maximize gain of the internal power supply.

The patent document 1 describes a voltage generation circuit comprising a capacitor that is commonly used as both a pumping capacitor in a first voltage generation circuit for generating a first voltage and a pumping capacitor in a second voltage generation circuit for generating a second voltage. The voltage generation circuit described in the Patent Document 1 reduces its layout area because the circuit generates the first voltage and the second voltage by the single pumping capacitor.

[Patent Document 1]
  JP Patent Kokai Publication No. JP-P2003-151279A

SUMMARY

The entire disclosure in the above-mentioned Patent Document is incorporated herein by reference. The following analysis is given by the present invention.

FIG. 3 shows a structure of a control circuit for a voltage step-up circuit based on the above scheme. Therefore, the VPP voltage step-up circuit 120 and the VPEQ voltage step-up circuit 110, both of which need a pump capacitor (capacitor) with a large capacitance, must be provided independently. A VPEQ detection circuit 121 detects a voltage of VPEQ and generates a VPEQON signal to start a VPEQ oscillator 122 when the detected voltage is lower than a designed voltage value. The VPEQ oscillator 122 generates a pulse signal 1 at a constant period. A timing adjusting delay circuit 133 for the VPP voltage step-up circuit generates pulse signals A to C and E. A timing adjusting delay circuit 123 for the VPEQ voltage step-up circuit generates a pulse signal B and a pulse signal D. A VPP detection circuit 131 detects a voltage VPP and generates a VPPON signal to start a VPP oscillator 132 when the detected voltage VPP is lower than a designed voltage value. The VPP oscillator 132 is a circuit generating a pulse signal 2 at a constant period.

There is a problem that the circuit structure shown in FIG. 3 occupies large circuit area because a pump capacitor (capacitor) must be provided for each of the two-times voltage step-up circuit (VPEQ voltage step-up circuit) and the three-times voltage step-up circuit (VPP voltage step-up circuit). The VPEQ latch circuit 114 in FIG. 5 may be connected to the node B in FIG. 4. However, there is a problem that a correct voltage level can not be produced, because VPP and VPEQ are simultaneously stepped up.

The voltage generation circuit described in the Patent Document 1 reduces the layout area by sharing one of capacitors for pumping action between the first voltage generation circuit and the second voltage generation circuit. However, there is a problem that area reduction by sharing a single capacitor is too small.

Therefore, the present invention seeks to reduce circuit area of a voltage step-up circuit with a plurality of stepped-up levels.

According to a first aspect of the present invention, there is provided a semiconductor device whose internal power supply voltage is generated by a voltage step-up circuit that comprises: a first capacitor coupled between a first node and a second node; a second capacitor coupled between a third node and a fourth node; a first switch disposed between the first node and the third node; a second switch disposed between the second node and the fourth node; a third switch disposed between the second node and the third node; a first terminal disposed to the first node; a second terminal disposed to the second node; a third terminal disposed to the fourth node; a fourth switch disposed between the fourth node and the third terminal. The voltage step-up circuit further comprises: a first voltage detection circuit that detects a voltage at the second terminal and compares the voltage with a first predetermined reference voltage; a second voltage detection circuit that detects a voltage at the third terminal and compares the voltage with a second predetermined reference voltage; and a switch control circuit that receives detection signals detected by the first voltage detection circuit and the second voltage detection circuit and controls the first switch, the second switch, the third switch and the fourth switch. The switch control circuit controls the first switch and the second switch to be in a conducting state and controls the third switch and the fourth switch to be in a non-conducting state if a condition is satisfied that a voltage at the second terminal is lower than a first predetermined reference voltage and a voltage at the third terminal is higher than a second predetermined reference voltage; and, when a predetermined pulse signal is input to the first terminal, the first capacitor and the second capacitor output a first stepped-up voltage to the second terminal.

According to a second aspect of the present invention, there is provided a semiconductor device whose internal power supply voltage is generated by a voltage step-up circuit that comprises: a first capacitor; a second capacitor; a first switch that connects a first terminal of the first capacitor and a first terminal of the second capacitor; a second switch that connects a second terminal of the first capacitor and a second terminal of the second capacitor; a third switch that connects the second terminal of the first capacitor and the first terminal of the second capacitor; and a switch control circuit that controls the first switch, the second switch, and the third switch. The switch control circuit controls, in a first voltage step-up operation mode, the first switch and the second switch to be in a non-conducting state and controls the third switch to be in a conducting state, so that the first and second capacitors are connected in series and, when a predetermined pulse signal is input to the first terminal of the first capacitor, the first capacitor outputting a first stepped-up voltage from the second terminal of the first capacitor and the second capacitor outputting a second stepped-up voltage, which is stepped-up to a higher voltage than the first stepped-up voltage, from the second terminal of the second capacitor; and the switch control circuit controls, in a second voltage step-up operation mode, the first switch and the second switch to be in a conducting state and controls the third switch to be in a non-conducting state, so that the first and second capacitors are connected in parallel and, when a predetermined pulse signal is input to the first terminal of the first capacitor and to the first terminal of the second capacitor, the first capacitor and the second capacitor output a first stepped-up voltage from each of their second terminals.

According to a third aspect of the present invention, there is provided a semiconductor device comprising: a voltage step-up circuit that comprises at least a first capacitor and a second capacitor which generate an internal power supply voltage; and a control circuit that controls the voltage step-up circuit; wherein the control circuit connects the first and second capacitors in series to perform a first voltage step-up operation and connects the first and second capacitors in parallel to perform a second voltage step-up operation, and the voltage step-up circuit generates a first stepped-up voltage in the first voltage step-up operation and generates a second stepped-up voltage in the second voltage step-up operation.

The meritorious effects of the present invention are summarized as follows. The semiconductor device according to the present invention reduces the circuit area of the voltage step-up circuit with a plurality of stepped-up levels. This is because the first pump capacitor (capacitor) and the second pump capacitor (capacitor) are used commonly in both voltage step-up operations, so that there is no need to provide different pump capacitors (capacitors) for each stepped-up level.

BRIEF DESCRIPTION OF THE DRAWINGS

The above features and advantages of the present invention will be more apparent from the following description of certain preferred embodiments taken in conjunction with the accompanying drawings, in which.

PREFERRED MODES

Figure 1:
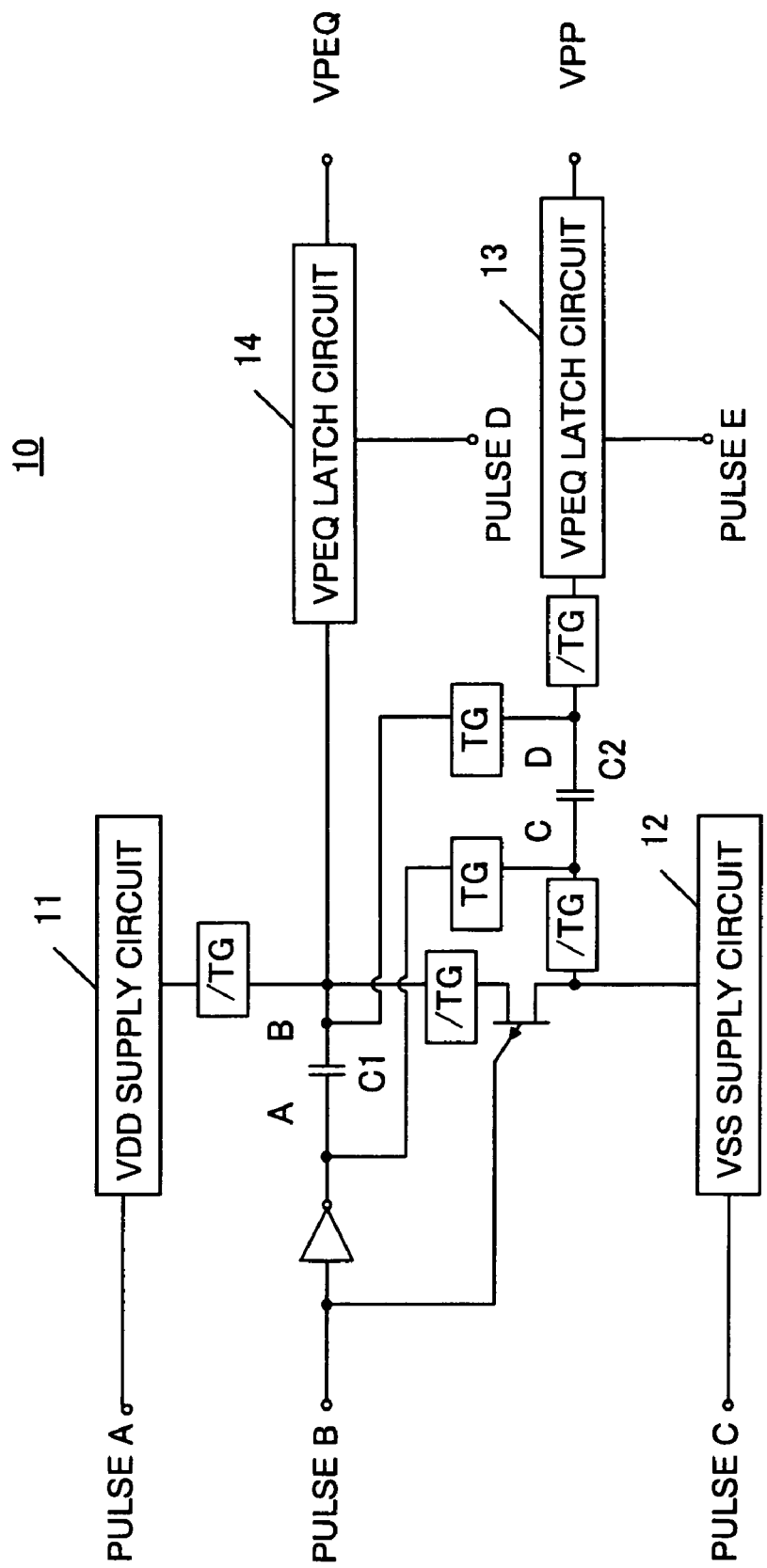
FIG. 1 is a bock diagram showing a structure of a voltage step-up circuit according to an exemplary embodiment of the present invention.

A first mode (mode 1) is aforementioned as the first aspect. In the first aspect, there are possible modes as follows.

The switch control circuit may control the first switch and the second switch to be in a non-conducting state and control the third switch and the fourth switch to be in a conducting state if the condition is not satisfied; and, when a predetermined pulse signal is input to the first terminal, the first capacitor outputs a first stepped-up voltage to the second terminal and the second capacitor outputs a second stepped-up voltage to the third terminal. (mode 2)

The first stepped-up voltage may be lower than the second stepped-up voltage. (mode 3)

Voltage amplitude of the pulse signal may be lower than the first stepped-up voltage. (mode 4)

The switch control circuit may comprise a voltage level shift circuit that receives detection signals detected by the first and the second voltage detection circuits and the second stepped-up voltage; and an output signal from the switch control circuit has an amplitude ranging from the ground voltage to the second stepped-up voltage. (mode 5)

The voltage step-up circuit may further comprise: a first voltage source that supplies a voltage which is lower than the first stepped-up voltage and the second stepped-up voltage and higher than the ground voltage; and a fifth switch disposed between the second node and the first voltage source; wherein the fifth switch is controlled to be in a conducting state when the pulse signal is in an inactive state. (mode 6)

The voltage step-up circuit may further comprise a sixth switch disposed between the third node and a ground voltage source; wherein the sixth switch is controlled to be in a conducting state when the pulse signal is in an inactive state. (mode 7)

The voltage step-up circuit may further comprise a seventh switch, disposed to the third switch in series, whose gate is controlled by the pulse signal. (mode 8)

The voltage step-up circuit may further comprise an eighth switch disposed between the second node and the second terminal; wherein the eighth switch is controlled to be in a conducting state when the pulse signal is in an active state. (mode 9)

The voltage step-up circuit may further comprise: a ninth switch disposed between the fourth node and the first voltage source; and a tenth switch disposed between the fourth node and the third terminal; wherein the ninth switch is controlled to be in a conducting state when the pulse signal is in an inactive state; and the tenth switch is controlled to be in a conducting state when the pulse signal is in an active state. (mode 10)

A further mode (mode 11) is aforementioned as the second aspect. In the second aspect, there are possible modes as follows.

In the second aspect, the switch control circuit may detect the first stepped-up voltage and the second stepped-up voltage and compare the voltages, respectively, with a first predetermined reference voltage and a second predetermined reference voltage; controls the first switch, the second switch and the third switch in accordance with a second voltage step-up operation mode if a condition is satisfied that the first stepped-up voltage is higher than the first predetermined reference voltage and the second stepped-up voltage is lower than the second the second predetermined reference voltage; and may control the first switch, the second switch and the third switch in accordance with the first voltage step-up operation mode if the condition is not satisfied. (mode 12)

The first voltage step-up operation may be a three-times voltage step-up operation and the second voltage step-up operation may be a two-times voltage step-up operation. (mode 13)

The first voltage step-up operation may be an M-times voltage step-up operation (where M is a natural number which is at least four) and the second voltage step-up operation may be an N-times voltage step-up operation (where N is a natural number which is at least two and not greater than (M−1)). (mode 14)

A still further mode (mode 15) is aforementioned as the third aspect. In the third aspect, there are possible modes as follows.

In the third aspect, the control circuit detects a voltage generated in the first and second voltage step-up operations respectively, controls the voltage step-up circuit to perform the second voltage step-up operation when the voltage generated in the first voltage step-up operation is not less than a predetermined stepped-up voltage level and the voltage generated in the second voltage step-up operation is not greater than a predetermined stepped-up voltage level, and otherwise controls the voltage step-up circuit to perform the first voltage step-up operation. (mode 16)

The first voltage step-up operation may be a three-times step-up voltage step-up operation, and the second voltage step-up operation may be a two-times step-up voltage step-up operation. (mode 17)

The first voltage step-up operation may be an M-times voltage step-up operation (where M is a natural number which is at least four) and the second voltage step-up operation may be an N-times voltage step-up operation (where N is a natural number which is at least two and not greater than (M−1)). (mode 18)

The invention will be now described herein with reference to illustrative exemplary embodiments. Those skilled in the art will recognize that many alternative exemplary embodiments can be accomplished using the teachings of the present invention and that the invention is not limited to the embodiments illustrated for explanatory purposes. A voltage step-up circuit according to a preferred embodiment of the present invention is described with reference to the drawings. With reference to FIG. 1, a voltage step-up circuit 10 comprises a first pump capacitor (capacitor) C1 and a second pump capacitor (capacitor) C2. The voltage step-up circuit 10 generates a first stepped-up voltage in a first voltage step-up operation and a second stepped-up voltage in a second voltage step-up operation. The first pump capacitor (capacitor) C1 and the second pump capacitor (capacitor) C2 are connected in series in the first voltage step-up operation and connected in parallel in the second voltage step-up operation.

Figure 2:
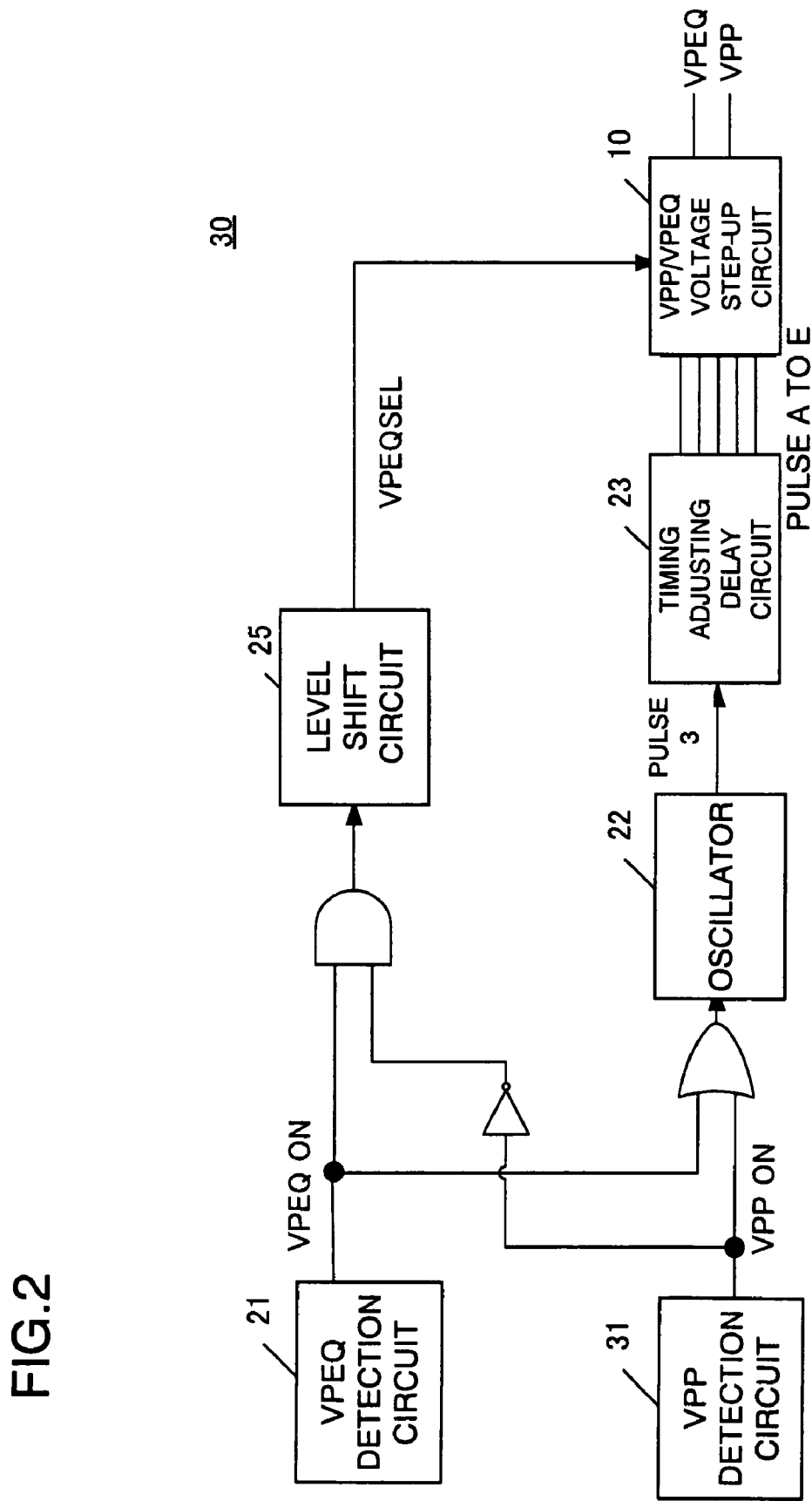
FIG. 2 is a block diagram showing a structure of a control circuit (switch control circuit) according to an exemplary embodiment of the present invention.
Figure 3:
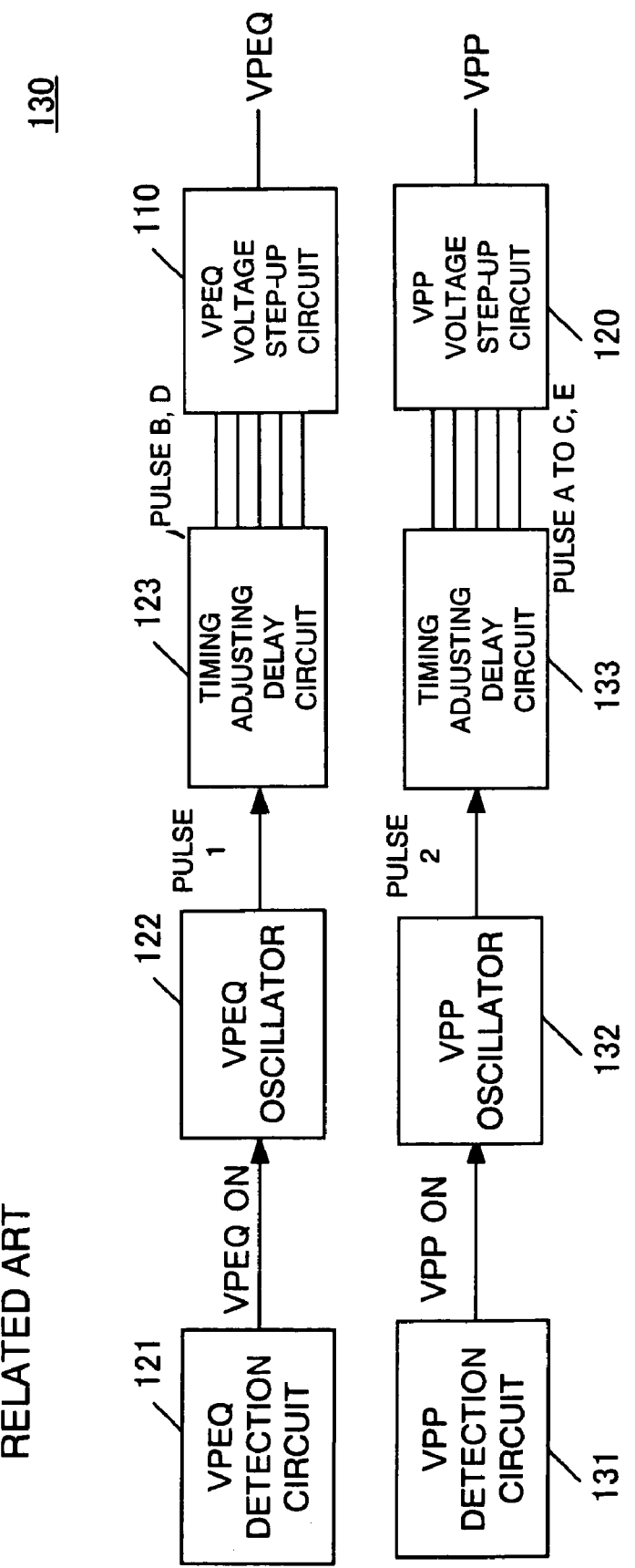
FIG. 3 is a block diagram showing a structure of a conventional control circuit for a voltage step-up circuit.

The voltage step-up circuit 10 preferably comprises a control circuit (switch control circuit) 30 as shown in FIG. 2. The control circuit (switch control circuit) 30 detects voltages (VPP, VPEQ) generated, respectively, in the first voltage step-up operation and the second voltage step-up operation. The control circuit (switch control circuit) 30 connects the first pump capacitor (capacitor) C1 and the second pump capacitor (capacitor) C2 in parallel to perform the second voltage step-up operation when a voltage VPEQ generated in the first voltage step-up operation is at a predetermined stepped-up voltage level and a voltage generated in the second voltage step-up operation is not at a predetermined stepped-up voltage level. Otherwise, the control circuit (switch control circuit) 30 connects the first pump capacitor (capacitor) C1 and the second pump capacitor (capacitor) C2 in series to perform the first voltage step-up operation.

Moreover, the first voltage step-up operation may be a three-times voltage step-up operation, and the second voltage step-up operation may be a two-times voltage step-up operation.

The first voltage step-up operation may be an M-times voltage step-up operation (where M is a natural number which is greater than or equal to four) and the second voltage step-up operation may be an N-times voltage step-up operation (where N is a natural number which is greater than or equal to two and smaller than or equal to (M−1)).

First Example

A first example of the present invention is described in detail with reference to the drawings. FIG. 1 is a bock diagram showing a structure of a VPP/VPEQ voltage step-up circuit 10 according to the present example. The circuit TG and /TG are transfer gates for generating a voltage VPP. Pulse signals A to E are a pulse adjusted to maximize the gain of the internal power supply. Since a VDD supply circuit 11, a VSS supply circuit 12, a VPP latch circuit 13 and VPEQ latch circuit 14 operate in similar manner as the VDD supply circuit 111, the VSS supply circuit 112, the VPP latch circuit 113 and the VPEQ latch circuit 114, the explanation thereof is omitted. The relevant disclosure of the Patent Document 1 is herein incorporated by reference thereto.

Figure 4:
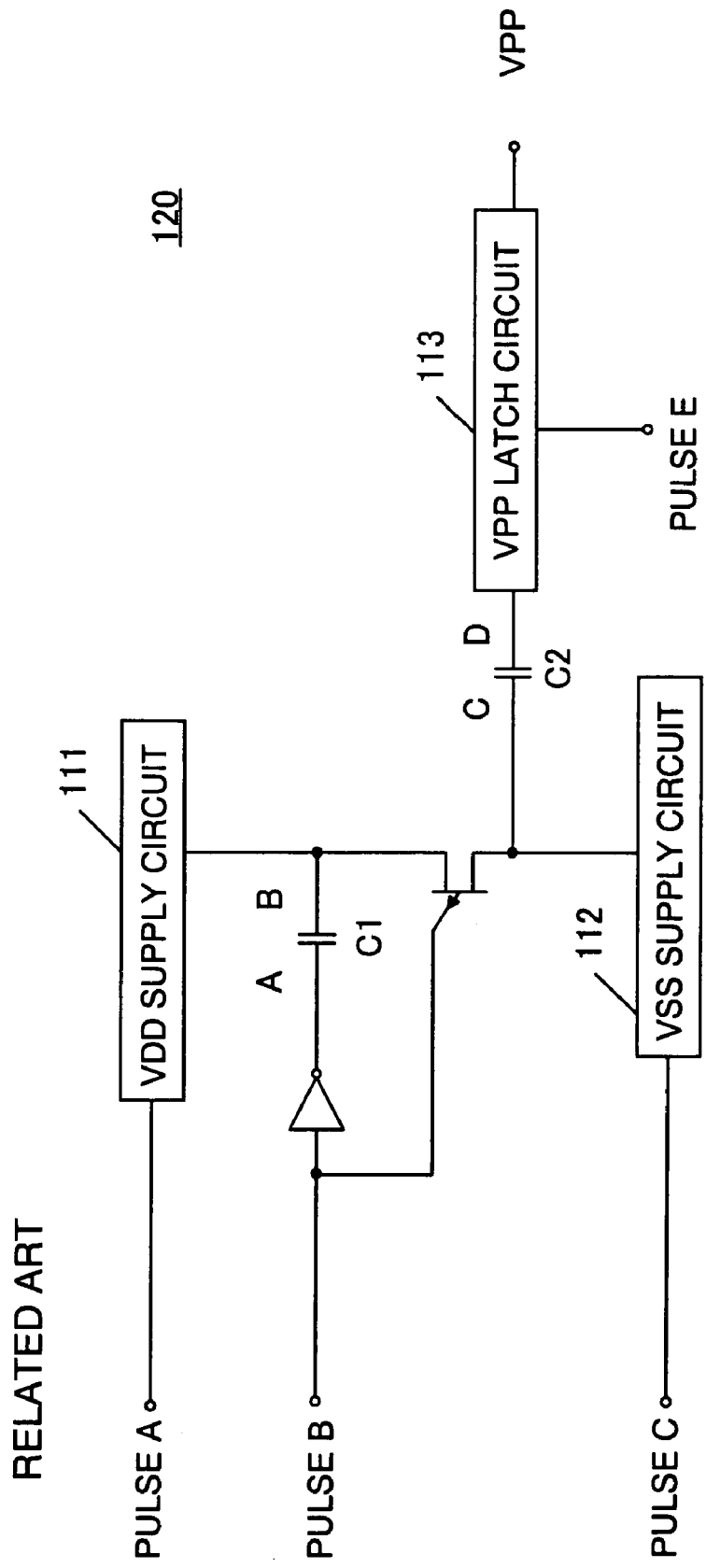
FIG. 4 is a block diagram showing a structure of a three-times voltage step-up circuit (VPP voltage step-up circuit)
Figure 5:
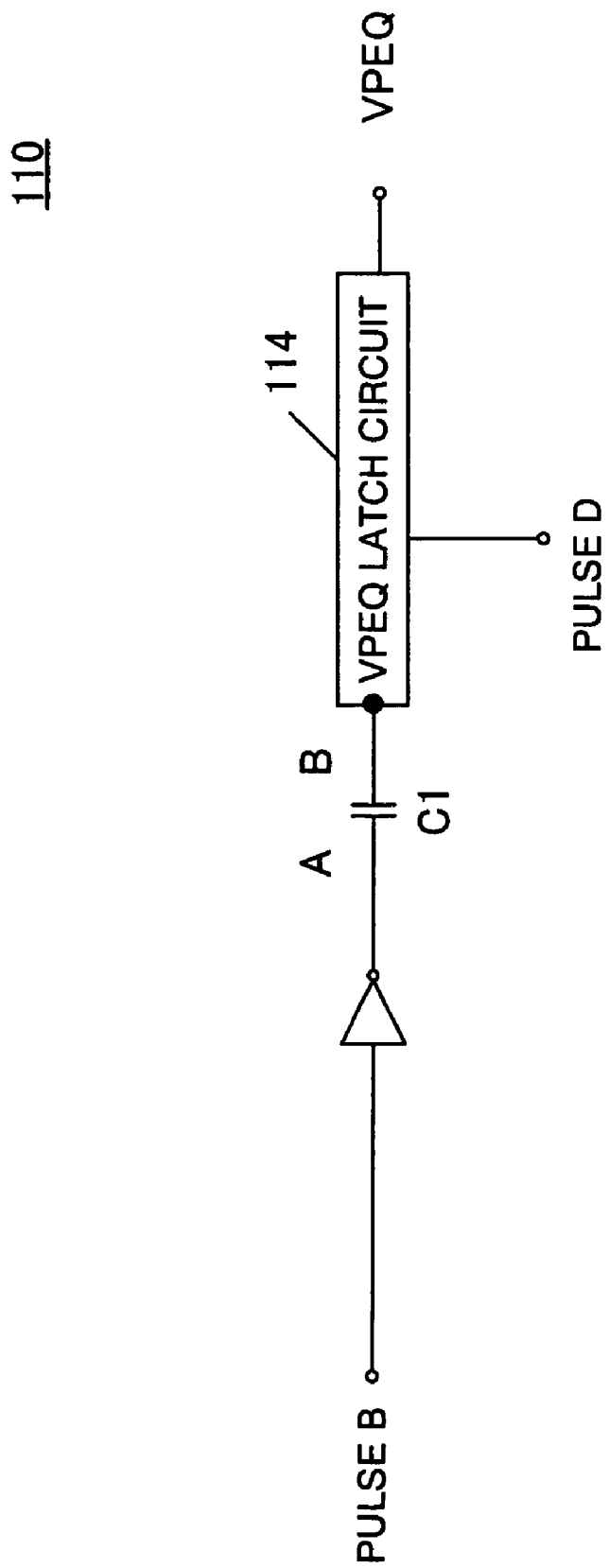
FIG. 5 is a block diagram showing a structure of a two-times voltage step-up circuit (VPEQ voltage step-up circuit).

The starting skeleton structure of the circuit of FIG. 1 is based on the circuit shown in FIG. 4 as for the connections between the terminals A, B, C and E and VDD supply circuit; VSS supply circuit and VPP latch circuit, an inverter, capacitor C1 disposed across nodes A and B, capacitor C2 disposed across nodes C and D, and a transistor controlled by a pulse B and connected between VDD supply circuit (node B) and VSS supply circuit (node C). The VPP latch circuit 113 of FIG. 4 is replaced by the VPEQ latch circuit 13 in FIG. 1, and a VPEQ latch circuit 14 controlled by a pulse D is connected between node B and a terminal VPEQ. A transfer gate TG is connected between nodes B and D, and between nodes A and C, whereas an inverted transfer gate /TG is connected between node B and VDD supply circuit 11, between node B and a source of the transistor, and between node C and the drain of the transistor which is connected to the VSS supply circuit 12.

FIG. 2 is a block diagram showing a structure of a control circuit (switch control circuit) 30 according to the present example. A control circuit (switch control circuit) 30 controls the VPP/VPEQ voltage step-up circuit 10 (FIG. 1). With reference to FIG. 2, the control circuit (switch control circuit) 30 comprises a VPEQ detection circuit (first voltage detection circuit) 21, a VPP detection circuit (second voltage detection circuit) 31, an oscillator 22, a timing adjusting delay circuit 23 and a level shift circuit 25. The level shift circuit 25 receives an output signal of an AND gate connected with an output of the VPEQ detection circuit 21 (VPEQON signal) and an inverted signal of an output of the VPP detection circuit 31 (VPPON signal).

The VPEQ detection circuit (first voltage detection circuit) 21 detects a voltage of VPEQ and generate a VPEQON signal to start a (VPEQ) oscillator 22 when the detected voltage is lower than a designed voltage value. The VPP detection circuit (second voltage detection circuit) 31 detects a voltage of VPP and generates a VPPON signal to start the (VPP) oscillator 22 when the detected voltage is lower than a designed voltage value. The oscillator 22 generates a pulse signal 3 with a constant period while the VPEQON signal or the VPPON signal continues. The timing adjusting delay circuit 23 is a circuit for generating pulse signals A to E based on the pulse signal 3. The level shift circuit 25 shifts the operation level from VDD to VPP. A signal VPEQSEL controls the transfer gates TG and /TG in the VPP/VPEQ voltage step-up circuit 10.

If the signal VPEQSEL is TRUE, the transfer gates TG are in a conducting state (close) and the transfer gates /TG are in a non-conducting state (open). If the signal VPEQSEL is BAR, the transfer gates are in a non-conducting state (open) and the transfer gates /TG are in a conduction state (close). The signal VPEQSEL is generated (TRUE) when VPPON is not generated (FALSE) and the VPEQON is generated (TRUE). The VPEQSEL is generated (TRUE) when a stepped-up voltage only for the VPEQ is necessary. According to the structure shown in FIG. 2 and FIG. 1, the voltage step-up circuit operates as a three-times voltage step-up circuit for VPP when VPP is consumed and operate as a two-times voltage step-up circuit for VPEQ when VPEQ is consumed.

Use of a three-times voltage step-up circuit also as a two-times voltage step-up circuit prevents increase of the area occupied by the pump capacitors (capacitors) C1 and C2 with a large capacitance; and supply of VPEQ reduces the power consumption. Moreover, use of the two pump capacitors (capacitors) C1 and C2 for the three-times voltage step-up circuit as capacitors for the two-times voltage step-up circuit increases supply capacity of VPEQ.

Second Example

A three-times voltage step-up circuit and a two-times voltage step-up circuit coexist in the structure according to the above first example. An M-times voltage step-up circuit (where M is a natural number which is greater than or equal to four) can also constitute an N-times voltage step-up circuit (were N is a natural number which is less than M) when a pump capacitor (capacitor) is shared between the circuits. Although the above description is based on examples, the present invention is not restricted to the aforementioned examples and examples or exemplary embodiments.

The semiconductor device according to the present invention is applicable to a low voltage device with a three-times voltage step-up circuit.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A semiconductor device whose internal power supply voltage is generated by a voltage step-up circuit that comprises:
    a first capacitor coupled between a first node and a second node;
    a second capacitor coupled between a third node and a fourth node;
    a first switch disposed between the first node and the third node;
    a second switch disposed between the second node and the fourth node;
    a third switch disposed between the second node and the third node;
    a first terminal connected to the first node;
    a second terminal connected to the second node;
    a third terminal connected to the fourth node;
    a fourth switch disposed between the fourth node and the third terminal;
    a first voltage detection circuit that detects a voltage at the second terminal and compares the voltage with a first predetermined reference voltage;
    a second voltage detection circuit that detects a voltage at the third terminal and compares the voltage with a second predetermined reference voltage; and
    a switch control circuit that receives detection signals detected by the first voltage detection circuit and the second voltage detection circuit and controls the first switch, the second switch, the third switch and the fourth switch; wherein
    the switch control circuit controls the first switch and the second switch to be in a conducting state and controls the third switch and the fourth switch to be in a non-conducting state if a condition is satisfied that a voltage at the second terminal is lower than a first predetermined reference voltage and a voltage at a third terminal is higher than a second predetermined reference voltage; and, when a predetermined pulse signal is input to the first terminal, the first capacitor and the second capacitor output a first stepped-up voltage to the second terminal.

2. The semiconductor device of claim 1, wherein the switch control circuit controls the first switch and the second switch to be in a non-conducting state and controls the third switch and the fourth switch to be in a conducting state if the condition is not satisfied; and, when a predetermined pulse signal is input to the first terminal, the first capacitor outputs a first stepped-up voltage to the second terminal and the second capacitor outputs a second stepped-up voltage to the third terminal.

3. The semiconductor device of claim 2, wherein the first stepped-up voltage is lower than the second stepped-up voltage.

4. The semiconductor device of claim 2, wherein voltage amplitude of the pulse signal is lower than the first stepped-up voltage.

5. The semiconductor device of claim 2, wherein the switch control circuit comprises a voltage level shift circuit that receives detection signals detected by the first and the second voltage detection circuits and the second stepped-up voltage; and an output signal from the switch control circuit has an amplitude ranging from the ground voltage to the second stepped-up voltage.

6. The semiconductor device of claim 2, wherein the voltage step-up circuit further comprises:
a first voltage source that supplies a voltage which is lower than the first stepped-up voltage and the second stepped-up voltage and higher than the ground voltage; and
a fifth switch disposed between the second node and the first voltage source; wherein the fifth switch is controlled to be in a conducting state when the pulse signal is in an inactive state.

7. The semiconductor device of claim 6, wherein the voltage step-up circuit further comprises a sixth switch disposed between the third node and a ground voltage source; wherein the sixth switch is controlled to be in a conducting state when the pulse signal is in an inactive state.

8. The semiconductor device of claim 6, wherein the voltage step-up circuit further comprises a seventh switch, disposed to the third switch in series, whose gate is controlled by the pulse signal.

9. The semiconductor device of claim 6, wherein the voltage step-up circuit further comprises an eighth switch disposed between the second node and the second terminal; wherein the eighth switch is controlled to be in a conducting state when the pulse signal is in an active state.

10. The semiconductor device of claim 7, wherein the voltage step-up circuit further comprises:
a ninth switch disposed between the fourth node and the first voltage source; and
a tenth switch disposed between the fourth node and the third terminal; wherein
the ninth switch is controlled to be in a conducting state when the pulse signal is in an inactive state; and
the tenth switch is controlled to be in a conducting state when the pulse signal is in an active state.

11. A semiconductor device whose internal power supply voltage is generated by a voltage step-up circuit that comprises:
a first capacitor;
a second capacitor;
a first switch that connects a first terminal of the first capacitor and a first terminal of the second capacitor;
a second switch that connects a second terminal of the first capacitor and a second terminal of the second capacitor;
a third switch that connects the second terminal of the first capacitor and the first terminal of the second capacitor; and
a switch control circuit that controls the first switch, the second switch, and the third switch,
wherein the switch control circuit controls, in a first voltage step-up operation mode, the first switch and the second switch to be in a non-conducting state and controls the third switch to be in a conducting state, so that the first and second capacitors are connected in series and, when a predetermined pulse signal is input to the first terminal of the first capacitor, the first capacitor outputting a first stepped-up voltage from the second terminal of the first capacitor and the second capacitor outputting a second stepped-up voltage, which is stepped-up to a higher voltage than the first stepped-up voltage, from the second terminal of the second capacitor; and
the switch control circuit controls, in a second voltage step-up operation mode, the first switch and the second switch to be in a conducting state and controls the third switch to be in a non-conducting state, so that the first and second capacitors are connected in parallel and, when a predetermined pulse signal is input to the first terminal of the first capacitor and to the first terminal of the second capacitor, the first capacitor and the second capacitor output a first stepped-up voltage from each of their second terminals, and
wherein the switch control circuit detects the first stepped-up voltage and the second stepped-up voltage and compares the voltages, respectively, with a first predetermined reference voltage and a second predetermined reference voltage; controls the first switch, the second switch and the third switch in accordance with a second voltage step-up operation mode if a condition is satisfied that the first stepped-up voltage is higher than the first predetermined reference voltage and the second stepped-up voltage is lower than the second the second predetermined reference voltage; and controls the first switch, the second switch and the third switch in accordance with the first voltage step-up operation mode if the condition is not satisfied.

12. The semiconductor device of claim 11, wherein the first voltage step-up operation is a three-times voltage step-up operation and the second voltage step-up operation is a two-times voltage step-up operation.

13. The semiconductor device of claim 11, wherein the first voltage step-up operation is an M-times voltage step-up operation (where M is a natural number which is at least four) and the second voltage step-up operation is an N-times voltage step-up operation (where N is a natural number which is at least two and not greater than (M−1)).

14. A semiconductor device comprising:
a voltage step-up circuit that comprises at least a first capacitor and a second capacitor which generate an internal power supply voltage; and
a control circuit that controls the voltage step-up circuit, wherein the control circuit connects the first and second capacitors in series to perform a first voltage step-up operation and connects the first and second capacitors in parallel to perform a second voltage step-up operation, and
the voltage step-up circuit generates a first stepped-up voltage in the first voltage step-up operation and generates a second stepped-up voltage in the second voltage step-up operation, and
wherein the control circuit detects a voltage generated in the first and second voltage step-up operations respectively, controls the voltage step-up circuit to perform the second voltage step-up operation when the voltage generated in the first voltage step-up operation is not less than a predetermined stepped-up voltage level and the voltage generated in the second voltage step-up operation is not greater than a predetermined stepped-up voltage level, and otherwise controls the voltage step-up circuit to perform the first voltage step-up operation.

15. The semiconductor device of claim 14, wherein the first voltage step-up operation is a three-times step-up voltage step-up operation, and the second voltage step-up operation is a two-times step-up voltage step-up operation.

16. The semiconductor device of claim 14, wherein the first voltage step-up operation is an M-times voltage step-up operation (where M is a natural number which is at least four) and the second voltage step-up operation is an N-times voltage step-up operation (where N is a natural number which is at least two and not greater than (M−1)).

* * * * *